United States Patent
Pan (10) Patent No.: US 11,428,346 B2
(45) Date of Patent: Aug. 30, 2022

(54) PROTECTION STRUCTURE OF SAMPLING TUBE OF TANK TRUCK

(71) Applicants: FU I SHIN ENTERPRISE CO., LTD., Kaohsiung (TW); SHIN YUEH APPLIED MATERIALS CO., LTD., Taoyuan (TW)

(72) Inventor: Wen-Hsiung Pan, Kaohsiung (TW)

(73) Assignees: FU I SHIN ENTERPRISE CO., LTD., Kaohusing (TW); SHIN YUEH APPLIED MATERIALS CO., LTD., Taoyuan (TW)

( * ) Notice: Subject to any disclaimer, the term of this patent is extended or adjusted under 35 U.S.C. 154(b) by 255 days.

(21) Appl. No.: 16/878,598

(22) Filed: May 19, 2020

(65) Prior Publication Data

US 2021/0364104 A1    Nov. 25, 2021

(51) Int. Cl.
*F16L 3/12*    (2006.01)
*F16L 3/10*    (2006.01)

(52) U.S. Cl.
CPC .......... *F16L 3/1222* (2013.01); *F16L 3/1016* (2013.01); *F16L 3/1207* (2013.01); *F16L 2201/20* (2013.01)

(58) Field of Classification Search
CPC ......... F16L 3/1016; F16L 3/10; F16L 3/1091; F16L 3/1222; F16L 29/002; F16L 41/025; F16L 41/12; F16L 25/12; F16L 3/1207; F16L 2201/20; F16K 1/34; F16K 1/42
See application file for complete search history.

(56) References Cited

U.S. PATENT DOCUMENTS

| | | | | |
|---|---|---|---|---|
| 2,994,342 A | * | 8/1961 | Stillwagon | F16K 1/2265 137/454.2 |
| 3,643,983 A | * | 2/1972 | Ludeman | F16L 23/003 285/31 |
| 4,429,903 A | * | 2/1984 | Baker | F16L 55/179 285/31 |
| 4,864,707 A | * | 9/1989 | Kamenster | F16L 23/003 29/271 |
| 8,851,099 B2 | * | 10/2014 | DeGeorge | F16L 23/003 137/557 |

(Continued)

FOREIGN PATENT DOCUMENTS

| | | | | |
|---|---|---|---|---|
| CN | 203082318 U | * | 7/2013 | F16K 27/00 |
| CN | 112145810 A | * | 12/2020 | F16L 3/1091 |

(Continued)

*Primary Examiner* — Eret C McNichols
(74) *Attorney, Agent, or Firm* — Leong C. Lei (57) ABSTRACT

A protection structure of a sampling tube of a tank truck is provided. A positioning and protecting base is provided around an outer circumference of the sampling tube. The sampling tube includes a sampling output port for connection with a sampling output hose. The positioning and protecting base includes a through hole. The sampling output port extends through the through hole to partly project outside of the positioning and protecting base. With such an arrangement, the stiffness and strength of the entire sampling output port are enhanced for resisting impact and hit, and readiness of connection between the sampling output port and a sampling output hose is not negatively affected to thereby improve usage performance of the sampling tube.

7 Claims, 8 Drawing Sheets

(56) References Cited

U.S. PATENT DOCUMENTS

| | | | | |
|---|---|---|---|---|
| 9,933,086 | B2* | 4/2018 | Ho | F16K 1/34 |
| 9,976,666 | B1* | 5/2018 | New | F16K 1/2265 |
| 10,415,609 | B2* | 9/2019 | Golden | G01K 1/143 |
| 10,890,261 | B2* | 1/2021 | Reilly | F16K 3/0272 |
| 11,092,243 | B2* | 8/2021 | Thompson | F16K 1/2265 |
| 2013/0327412 | A1* | 12/2013 | DeGeorge | F16L 23/003 |
| | | | | 137/15.01 |
| 2017/0284870 | A1* | 10/2017 | Golden | F16M 13/022 |
| 2020/0263397 | A1* | 8/2020 | Wen | E03B 7/09 |
| 2021/0095797 | A1* | 4/2021 | Marakovits | F16L 17/04 |
| 2021/0239257 | A1* | 8/2021 | Stautner | F16L 37/46 |

FOREIGN PATENT DOCUMENTS

| | | | | |
|---|---|---|---|---|
| DE | 20013752 U1 * | 10/2000 | | F16L 3/1016 |
| KR | 20120029233 A * | 3/2012 | | |
| KR | 20120105647 A * | 9/2012 | | |

* cited by examiner

PROTECTION STRUCTURE OF SAMPLING TUBE OF TANK TRUCK

TECHNICAL FIELD OF THE INVENTION

The present invention relates to a protection structure of a sampling tube of a tank truck, and more particularly to a protection structure of a sampling tube of a tank truck that improves usage performance of the sampling tube.

DESCRIPTION OF THE PRIOR ART

Figure 1:
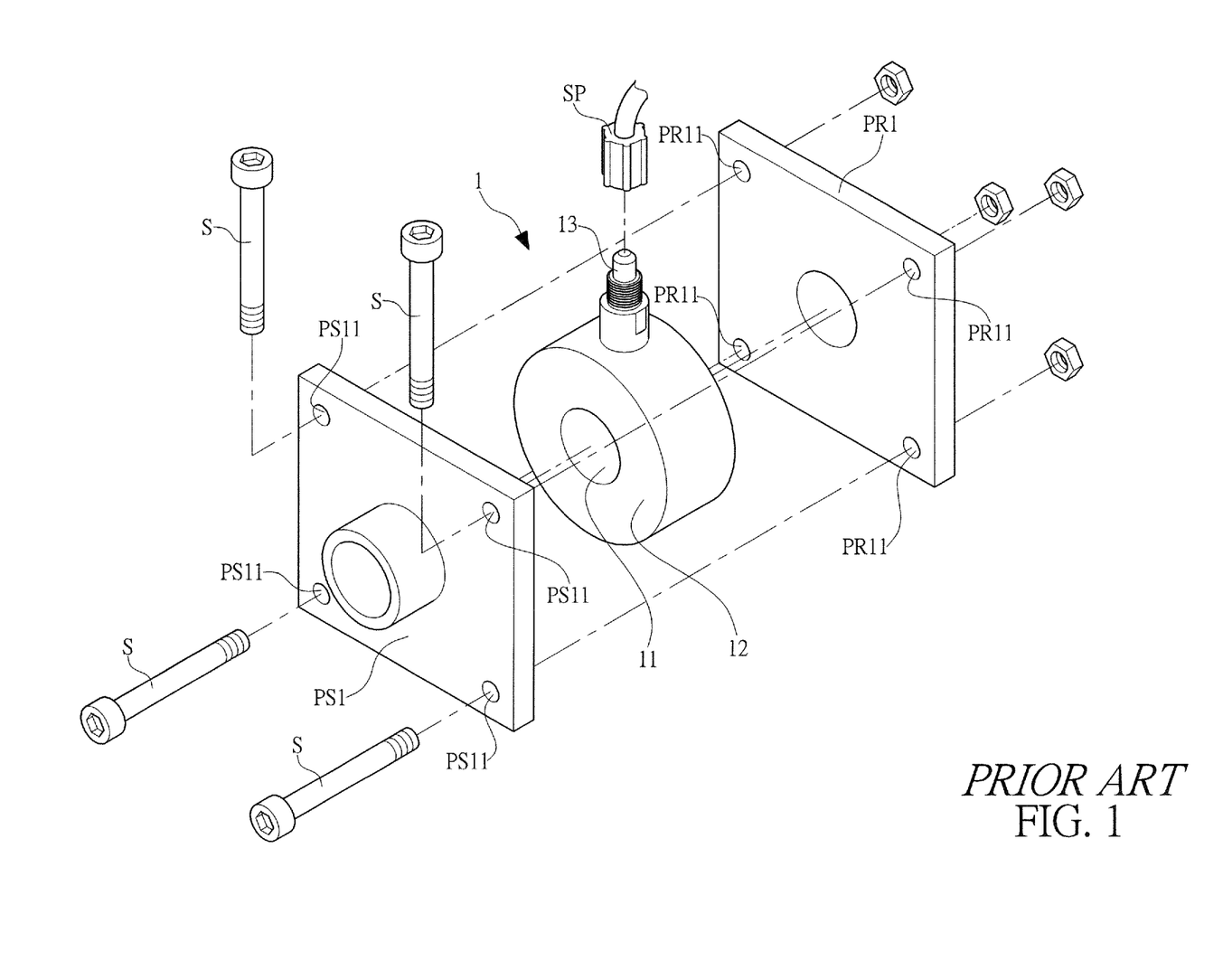
FIG. 1 is a perspective view showing a conventional sampling tube.
Figure 2:
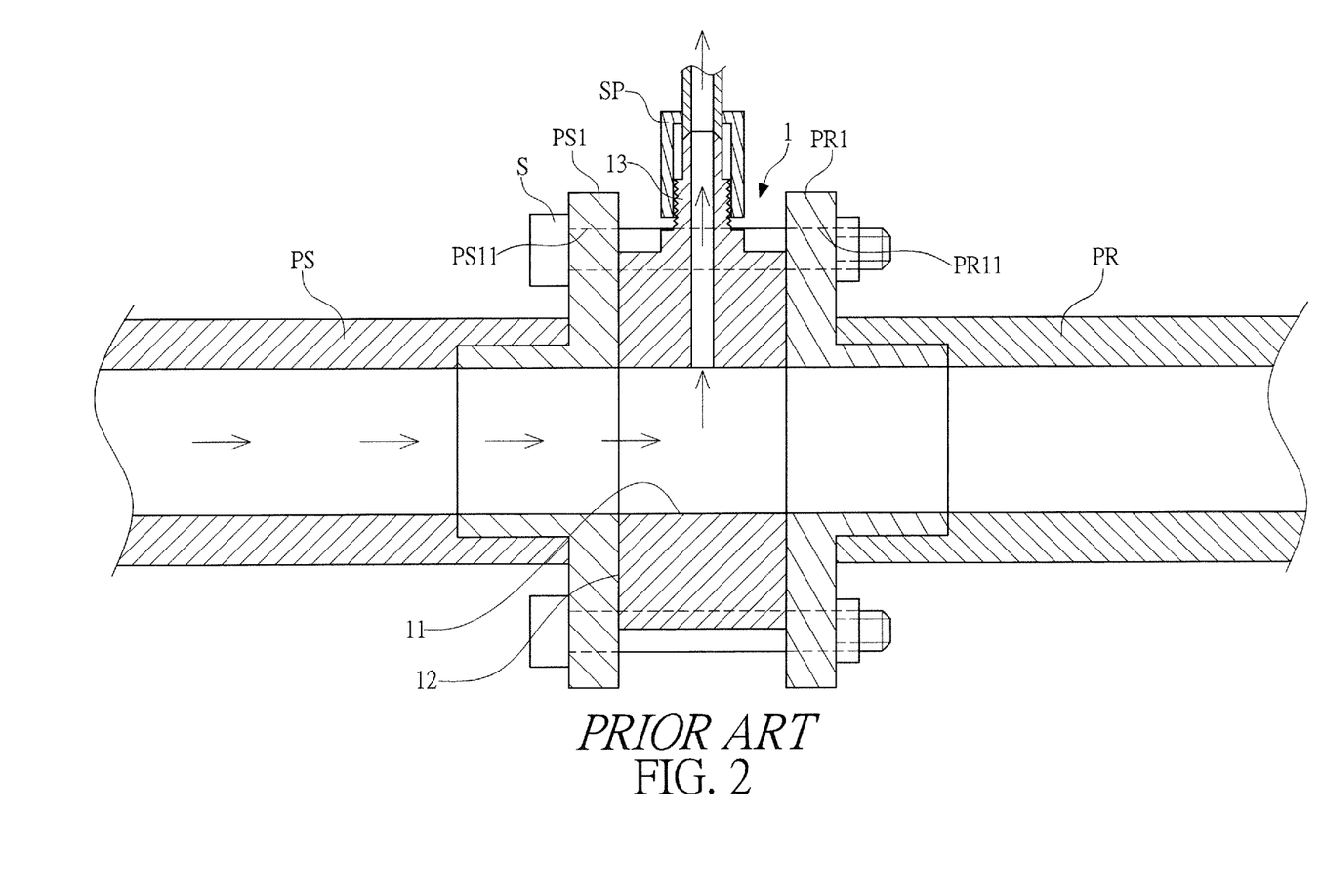
FIG. 2 is a schematic view showing an operation of sampling performed with the conventional sampling tube.

As shown in FIGS. 1 and 2, a tank truck transports a petrochemical substance, such as gasoline. A receiver party at a destination of transportation uses a sampling tube to confirm the petrochemical product received is correct. Thus, a sampling tube 1 will be connected between a supply pipe PS of the tank truck and a receiving pipe PR of the receiving party. The sampling tube 1 has a flow passage hole 11 penetrating through a center thereof. A clamping surface part 12 is provided around a circumference of the flow passage hole 11 of the sampling tube 1 for fixation purposes. A sampling output port 13 is raised from a top side of the sampling tube 1. The sampling output port 13 of the sampling tube 1 is structured to receive a sampling output pipe SP to screw thereto.

As shown in FIGS. 1 and 2, bolts S, after each penetrating through a through hole PR11 of a flange PR1 of the receiving pipe PR and a through hole PS11 of a flange PS1 of the supply pipe SP, is tightened to securely fix the sampling tube 1 between the flange PR1 of the receiving pipe PR and the flange PS1 of the supply pipe PS. To do sampling, it only needs to control a control valve (not shown) of the sampling tube SP to retrieve a sample in order to confirm if the petrochemical product transported with the tank truck is an order petrochemical substance.

The known way of sampling described above is effective in performing a sampling operation on a tank truck. However, during the known process of sampling, the sampling tube 1 is fixed between the flange PR1 of the receiving pipe PR and the flange PS1 of the supply pipe SP in a way of being clamped therebetween by first penetrating the bolts S through the through holes PR11 of the flange PR1 of the receiving pipe PR and the through holes PS11 of the flange PS1 of the supply pipe SP, followed by tightening, to achieve desired connection. However, the sampling tube 1 is of quite a weight and has a base that is a cylindrical body, making the desired connection through clamping the sampling tube 1 between the receiving pipe PR and the supply pipe PS often suffers occurrences of the sampling tube 1 unexpectedly falling, causing impact to the sampling output port 13 that is located on the top side of the sampling tube 1. Consequently, a portion of the base where the sampling output port 13 is connected to the sampling tube 1 may be damaged and severe damage may lead to leaking occurring in the portion of the base sampling output port 13 during a sampling operation. The leakage of such a petrochemical product may, in a severe condition, cause damage to human body and environment.

Thus, it is a challenge of the industry to provide a protection structure for a sampling tube of a tank truck for the purposes of providing an improved effect of pre-coupling positioning in order to protect the sampling output port from being damaged.

SUMMARY OF THE INVENTION

The primary objective of the present invention is to provide a protection structure of sampling tube of a tank truck, which helps overcome the drawback that a sampling output port of a sampling tube may be easily damaged due to falling and hitting occurring in making connection and thus causing undesired leaking.

For such a purpose, the primary technical solution according to the present invention defined in claim 1 provides a protection structure of a sampling tube of tank truck, wherein a positioning and protecting base is provided around an outer circumference of the sampling tube; the sampling tube comprises a sampling output port for connection with a sampling output hose, the positioning and protecting base comprising a through hole, the sampling output port extending through the through hole to partly project outside of the positioning and protecting base.

The efficacy that the technical solution according to the present invention defined in claim 1 may achieve is that, one the one hand, stiffness and strength of the entirety of the sampling output port are enhanced for resisting impact and hit, and on the other hand, readiness of connection between the sampling output port and a sampling output hose is not negatively affected to thereby improve usage performance of the sampling tube.

DETAILED DESCRIPTION OF THE PREFERRED EMBODIMENT

Figure 3:
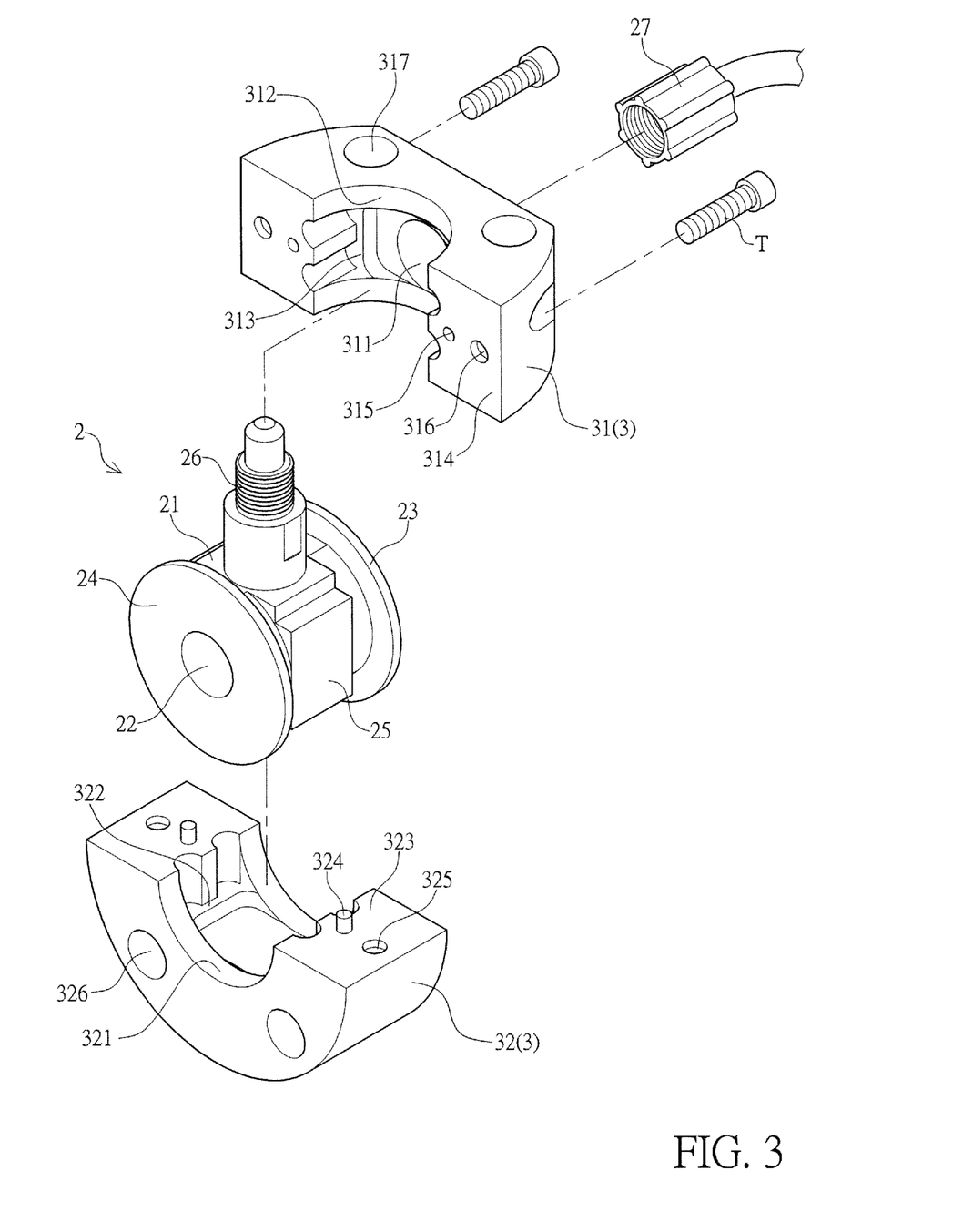
FIG. 3 is an exploded view showing a sampling tube protection structure according to the present invention.
Figure 4:
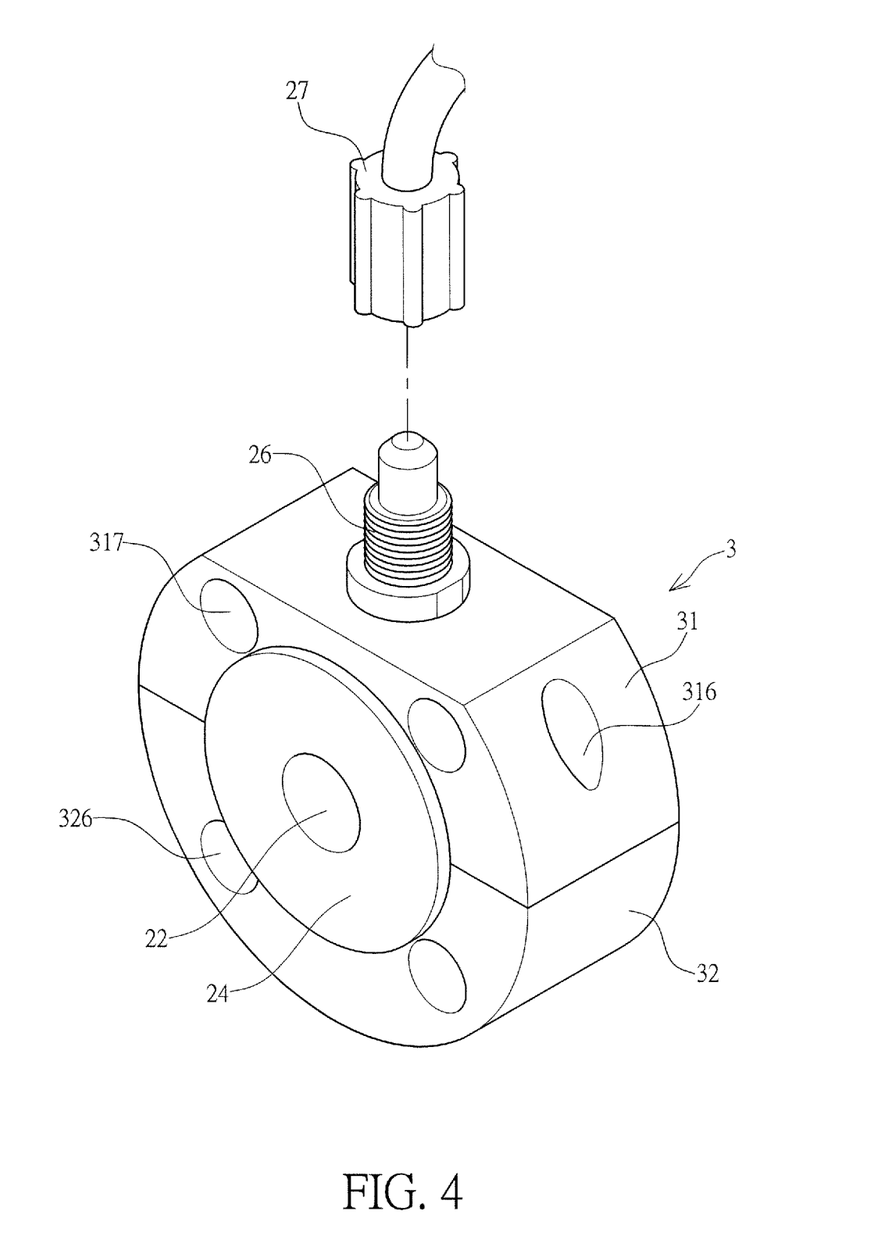
FIG. 4 is a perspective view showing a sampling tube according to the present invention.
Figure 5:
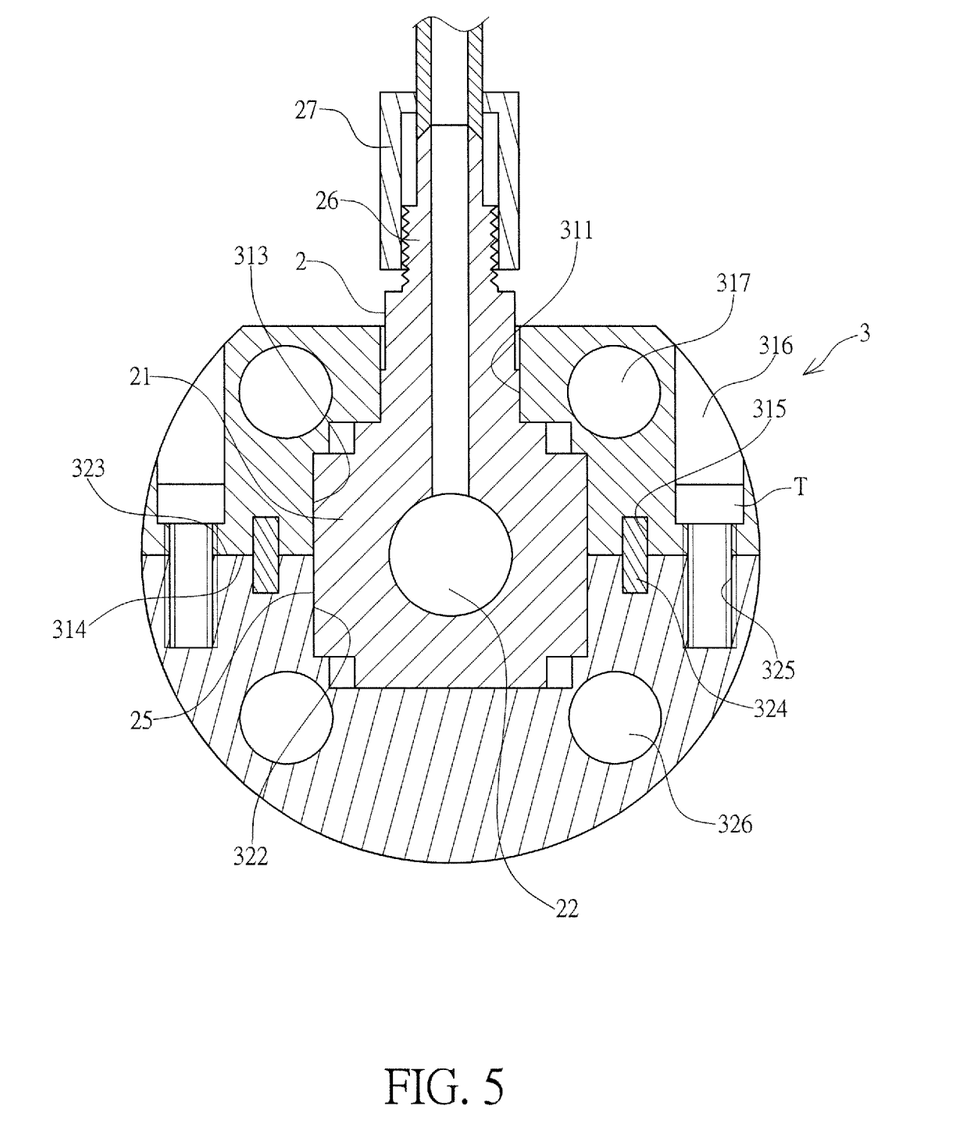
FIG. 5 is a cross-sectional view showing the sampling tube protection structure according to the present invention.

Firstly, referring to FIGS. 3, 4, and 5, the present invention provides a protection structure for a sampling tube of a tank truck. The sampling tube 2 is coupled, in a fixed manner, with a positioning and protecting base 3 in a radial direction thereof.

As shown in FIGS. 3, 4, and 5, the sampling tube 2 includes a tube body 21. The tube body 21 has a central portion in which a flow passage hole 22 is formed to axially extend therethrough. The tube body 21 has two axial ends each of which is provided with a flange 23, 24 projecting therefrom in an annular form. The tube body 21 is provided with at least one flat positioning surface 25, which is formed through cutting or machining, between the flanges 23, 24 on the two ends. The tube body 21 is provided, in a top side in a radial direction, with a sampling output port 26. The sampling output port 26 is provided for connecting with a sampling output hose 27.

As shown in FIGS. 3, 4, and 5, the positioning and protecting base 3 includes a first protection seat 31 and a second protection seat 32. The first protection seat 31 has an upper end that is a flat surface in a planar configuration and includes a through hole 311 roughly in a center thereof. The through hole 311 receives the sampling output port 26 of the sampling tube 2 to penetrate therethrough. The first protection seat 31 is formed, as being recessed in an inner side thereof, with a semi-circular constraining trough 312. The constraining trough 312 includes a positioning section 313 in the form of a flat surface. The positioning section 313 and the flat positioning surface 25 of the sampling tube 2 are arranged to correspond to each other, so that the positioning section 313 and the flat positioning surface 25 together provide an effect of constraining and positioning to achieve constraining and positioning of the sampling tube 2 in the interior of the positioning and protecting base 3. The first protection seat 31 is provided, at portions of a bottom thereof at two sides of the constraining trough 312, with coupling surfaces 314 each of which is of a planar form. The two coupling surfaces 314 are each provided with a positioning pin hole 315 and a positioning hole 316. The positioning pin hole 315 is a blind hole, while the positioning hole 316 is a through hole. The positioning hole 316 extends completely through the first protection seat 31. The first protection seat 31 is provided, on an upper side thereof at a location toward the coupling surfaces 314, with at least one penetrating hole 317 axially penetrating therethrough. The present invention is provided, in an embodiment, with two penetrating holes 317.

As shown in FIGS. 3, 4, and 5, the second protection seat 32 is formed, as being recessed in an inner side thereof, with a semi-circular constraining trough 321. The constraining trough 321 of the second protection seat 32 and the constraining trough 312 of the first protection seat 31 are arranged to face each other as being opposite to each other, so that the first protection seat 31 and the second protection seat 32 are combined together, the constraining trough 312 and the constraining trough 321 together form a circular mounting and positioning hole. The constraining trough 321 is provided therein with a positioning section 322 in the form of a flat surface. The positioning section 322 and the flat positioning surface 25 of the sampling tube 2 are arranged to correspond to each other, so that the positioning section 322 and the flat positioning surface 25 together provide an effect of constraining and positioning to achieve constraining and positioning of the sampling tube 2 in the interior of the positioning and protecting base 3. The second protection seat 32 is provided, at portions of a top thereof at two sides of the constraining trough 321, with coupling surfaces 323 each of which is of a planar form. The two coupling surfaces 323 are arranged to respectively correspond to the two coupling surfaces 314 of the first protection seat 31. The two coupling surfaces 323 are each provided with a positioning pin 324 and a positioning fastening hole 325. The positioning pin 324 corresponding to the positioning pin hole 315 of the first protection seat 31, so that the positioning pin 324 is insertable into the positioning pin hole 315 to achieve an effect of positioning. The positioning fastening hole 325 is a fastening hole including an internal thread. The second protection seat 32 is provided, on a lower side thereof at a location toward the coupling surfaces 323, with at least one penetrating hole 326 axially penetrating therethrough. The present invention is provided, in an embodiment, with two penetrating holes 326. The positioning fastening holes 325 of the second protection seat 32 correspond to the positioning holes 316 of the first protection seat 31. As such, fastening elements T may penetrate through the positioning holes 316 of the first protection seat 31 to screw into the positioning fastening holes 325 of the second protection seat 32, so as to have the first protection seat 31 and the second protection seat 32 screwed together to form the positioning and protecting base 3, and also to enclose and position the sampling tube 2 in the interior of the positioning and protecting base 3.

Figure 6:
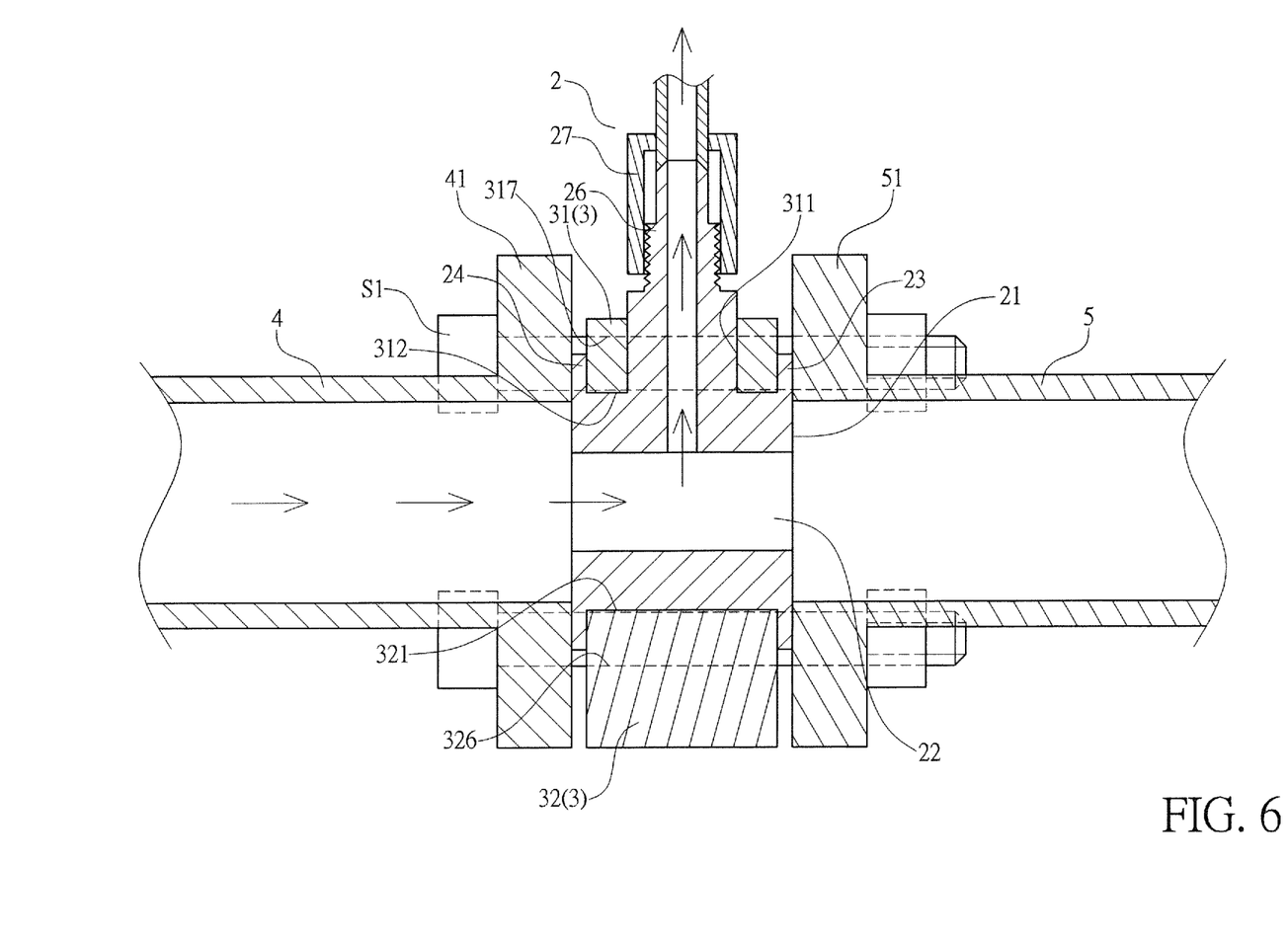
FIG. 6 is a schematic view showing an operation of sampling performed with the sampling tube protection structure according to the present invention.

As shown in FIGS. 4, 5, and 6, to use the present invention, the sampling tube 2 is disposed in the constraining trough 321 of the second protection seat 32, to allow the flat positioning surface 25 of the sampling tube 2 and the positioning section 322 of the second protection seat 32 to achieve the effect of constraining and positioning. Then, the coupling surfaces 314 of the first protection seat 31 and the coupling surfaces 323 of the second protection seat 32 are positioned against each other, so as to have the positioning pins 324 of the second protection seat 32 inserted into the positioning pin holes 315 of the first protection seat 31 to achieve pre-coupling positioning for the first protection seat 31 and the second protection seat 32, meanwhile the sampling output port 26 of the sampling tube 2 penetrate through the through hole 311 of the first protection seat 31 such that only a threaded portion of the sampling output port 26 projecting beyond and exposed outside the first protection seat 31. This would effectively reduce a portion of the sampling output port 26 that is exposed outside and could be potentially hit, so that, on the one hand, the overall stiffness and strength of the sampling output port 26 against impact can be enhanced and, on the other hand, readiness of connection between the sampling output port 26 and the sampling output hose 27 is not negatively affected. Under this condition, the fastening elements T can be put through the positioning holes 316 of the first protection seat 31 to screw into the positioning fastening holes 325 of the second protection seat 32 to fixedly combine the first protection seat 31 and the second protection seat 32 together to form the positioning and protecting base 3 that encloses an outer circumference of the sampling tube 2. In this way, the positioning and protecting base 3 may provide a protection effect, as a structure of stiffness, on the outer circumference of the sampling tube 2, and also to provide an effect protection against impact for the sampling output port 26 of the sampling tube 2. The positioning and protecting base 3 is provided to securely and firmly surround the outer circumference of the sampling tube 2, and then, bolts Si may be put through the penetrating holes 326 of the second protection seat 32 and a flange 41 of a discharge pipe 4 of a tank truck and the penetrating holes 317 of the first protection seat 31 and a flange 51 of a receiving pipe 5 of a receiving party to complete connection for sampling and discharging. As such, an operation of sampling, as well as conveying and receiving of a petrochemical substance, can be carried out by controlling a control valve (not shown) of a sampling output hose 27.

Figure 7:
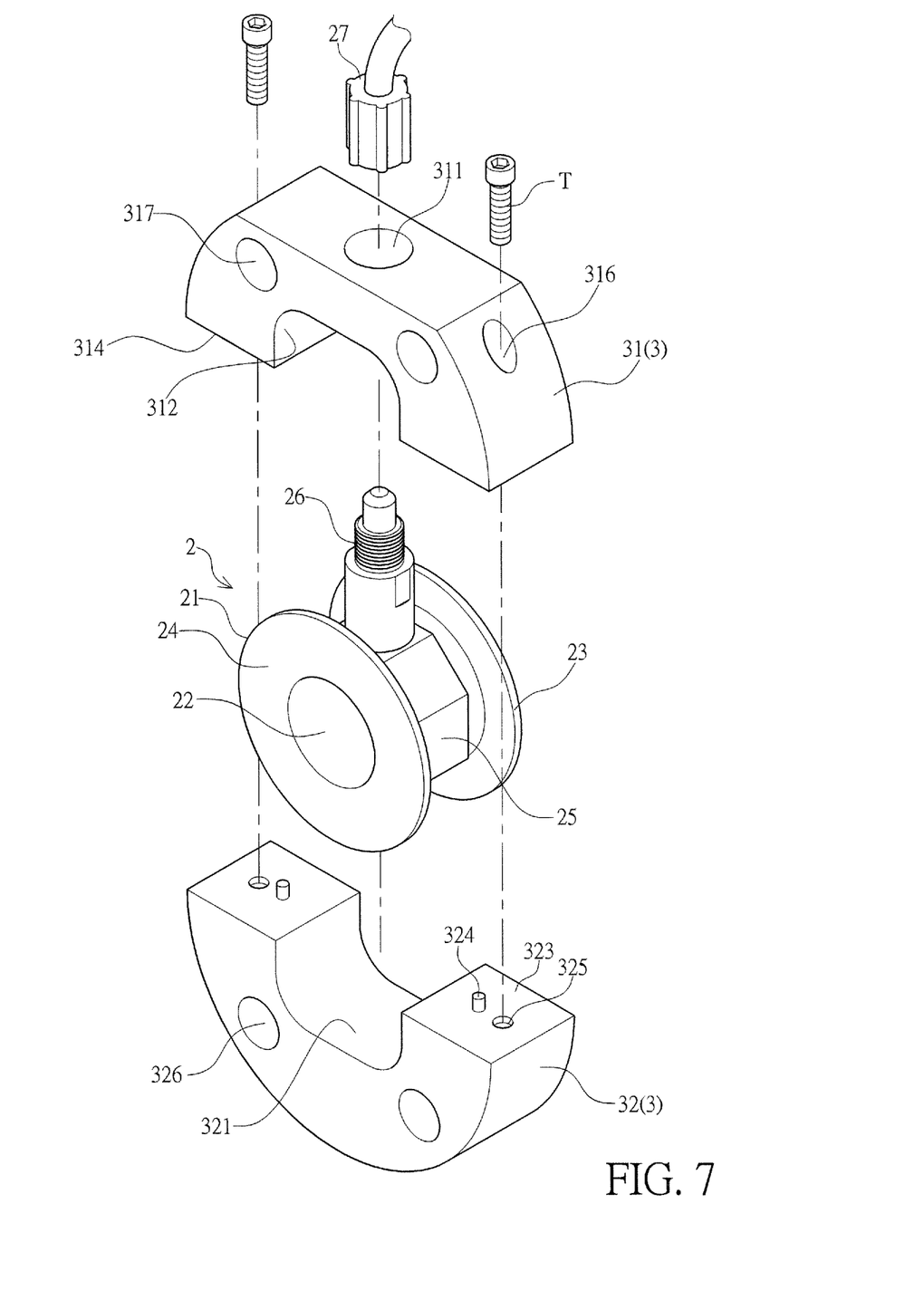
FIG. 7 shows another embodiment of the sampling tube protection structure according to the present invention.
Figure 8:
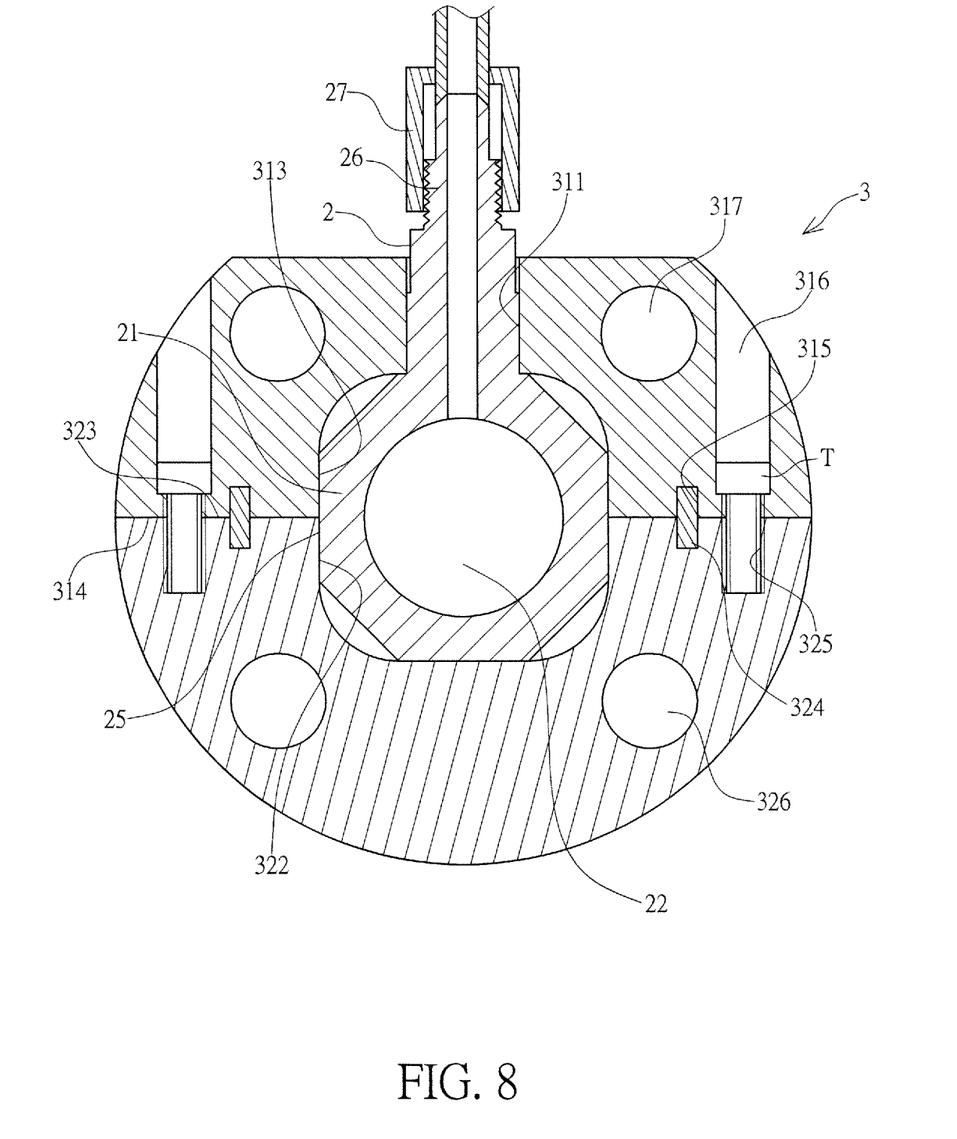
FIG. 8 is a cross-sectional view showing said another embodiment of the sampling tube protection structure according to the present invention.

As shown in FIGS. 7 and 8, the present invention may alternatively be structured such that the positioning section 313 of the constraining trough 312 of the first protection seat 31 is made in the form of a U-shaped configuration in a cross-section thereof, and the positioning section 322 of the constraining trough 321 of the second protection seat 32 is also embodied as a U-shaped configuration in a cross-section thereof. The tube body 21 of the sampling tube 2 is made, in the portion between the flanges 23, 24 of the two ends thereof, in the form of multiple flat surfaces as the flat positioning surface 25, such as four, six, or eight flat positioning surfaces 25, so that an improve positioning effect for mounting the sampling tube 2 in the positioning and protecting base 3 can be achieved.

The main efficacy of the present invention is that a positioning and protecting base 3 is provided around an outer circumference of a sampling tube 2, with a sampling output port 26 of the sampling tube 2 extending to the outside of the positioning and protecting base 3, so that, on the one hand, stiffness and strength of the entirety of the sampling output port 26 are enhanced for resisting impact and hit, and on the other hand, readiness of connection between the sampling output port 26 and a sampling output hose 27 is not negatively affected to thereby improve usage performance of the sampling tube 2.

I claim:

1. A protection structure of a sampling tube of a tank truck, wherein a positioning and protecting base is provided around an outer circumference of the sampling tube; the sampling tube comprises a sampling output port for connection with a sampling output hose, the positioning and protecting base comprising a through hole, the sampling output port extending through the through hole to partly project outside of the positioning and protecting base, wherein the positioning and protecting base comprises a first protection seat and a second protection seat.

2. The protection structure of the sampling tube of the tank truck according to claim 1, wherein the sampling tube comprises a tube body, the tube body comprising a central portion in which a flow passage hole is formed to axially extend therethrough, the tube body comprising two axial ends each of which is provided with a flange, the tube body comprising at least one flat positioning surface between the flanges on the two ends.

3. The protection structure of the sampling tube of the tank truck according to claim 1, wherein the first protection seat comprises an upper end that is a flat surface in a planar configuration and formed with a through hole around a center thereof, the first protection seat having an inner side that is recessed to form a semi-circular constraining trough, the constraining trough comprising a positioning section in the form of a flat surface, the first protection seat being provided, at portions of a bottom thereof at two sides of the constraining trough, with coupling surfaces each of which is of a planar form.

4. The protection structure of the sampling tube of the tank truck according to claim 3, wherein the two coupling surfaces are each provided with a positioning pin hole and a positioning hole; and the first protection seat is provided, on an upper side thereof at a location toward the coupling surfaces, with at least one penetrating hole axially penetrating therethrough.

5. The protection structure of the sampling tube of the tank truck according to claim 1, wherein the second protection seat has an inner side that is recessed to form a semi-circular constraining trough, the constraining trough comprising a positioning section in the form of a flat surface, coupling surfaces that are of a planar form being provided on portions of a top thereof at two sides of the constraining trough.

6. The protection structure of the sampling tube of the tank truck according to claim 5, wherein the two coupling surfaces are each provided with a positioning pin and a positioning fastening hole; and the second protection seat is provided, on a lower side thereof at a location toward the coupling surfaces, with at least one penetrating hole axially penetrating therethrough.

7. The protection structure of the sampling tube of the tank truck according to claim 1, wherein the positioning and protecting base comprises the first protection seat and the second protection seat; the first protection seat comprises a constraining trough, the constraining trough comprising a positioning section, the positioning section having a cross-section that is of a U-shape; the second protection seat comprises a constraining trough, the constraining trough comprising a positioning section, the positioning section having a cross-section that is of a U-shape; and the sampling tube comprises flat positioning surfaces, the flat positioning surfaces comprising multiple flat surfaces.

* * * * *